US005276514A

United States Patent [19]

Hyun

[11] Patent Number: 5,276,514

[45] Date of Patent: Jan. 4, 1994

[54] VIDEO SIGNAL PROCESSING APPARATUS FOR PROCESSING A HIGH RESOLUTION VIDEO SIGNAL USING A LOW FREQUENCY OSCILLATOR

[75] Inventor: Woon H. Hyun, Seongdongku, Rep. of Korea

[73] Assignee: Hyundai Electronics Industries Co., Ltd., Kyoungkido, Rep. of Korea

[21] Appl. No.: 995,779

[22] Filed: Dec. 23, 1992

[30] Foreign Application Priority Data

Dec. 28, 1991 [KR] Rep. of Korea ................ 1991-24826

[51] Int. Cl.[5] .............................................. H04N 5/14

[52] U.S. Cl. .................................... 358/160; 358/166; 358/167; 345/197; 345/201

[58] Field of Search ............... 358/160, 167, 166, 158, 358/159, 21; 340/799, 814; H04N 5/14

[56] References Cited

U.S. PATENT DOCUMENTS 4,776,025 10/1988 Hosoda .............................. 358/160
4,910,505 3/1990 Beaven ............................... 340/799

*Primary Examiner*—James J. Groody
*Assistant Examiner*—Sherrie Hsia
*Attorney, Agent, or Firm*—Darby & Darby

[57] ABSTRACT

This invention relates to a video signal processing apparatus using a low frequency oscillator to obtain high resolution. This invention comprises a dividing counter 16, an oscillator 17, CRTC 11, two RAM's 12 and 14, and two shift registers 13 and 15.

1 Claim, 3 Drawing Sheets

VIDEO SIGNAL PROCESSING APPARATUS FOR PROCESSING A HIGH RESOLUTION VIDEO SIGNAL USING A LOW FREQUENCY OSCILLATOR

BACKGROUND OF THE INVENTION

This invention relates to a video signal processing apparatus for processing the video signal of high resolution, using a low frequency oscillator.

FIG. 1 shows the construction of the conventional video signal processing apparatus, and in this drawing, the reference number 1 shows CRTC (Cathode Ray Tube Controller), 2 a video memory, 3 a shift register, 4 an oscillator, 5 a counter, and 6 a monitor, respectively.

The CRTC 1 inputs a vertical synchronizing signal (Vsync) and a horizontal synchronizing signal (Hsync), and outputs a row address (RAO to RAn) and a memory address (MAO to MAn) to the video memory 2. The row address is counted as scan line number forming a pixel per one row, according to the clock outputted from the counter 5, and the memory address (MAO to MAn) is also counted according to the clock (CCLK). One pixel is formed as 40 dots×32 scan lines, the maximum character number on one picture is 32×32, that is, 1024 characters. Accordingly, the memory address (MAO to MAn) for displaying 1024 characters is to be counted in order to display 1024 characters each horizontal synchronizing signal period.

Therefore, the data written into the video memory 2 according to the memory address (MAO to MAN) and the row address (RAO to RAn) of the CRTC 1 is loaded in parallel from the video memory output terminal (DO to Dn) to the shift register 3 each clock of the load clock signal, and the shift register 3 converts the inputted parallel stream video data to the serial stream video data each clock of the dot clock signal and outputs them to the monitor 6.

Accordingly, if a high resolution corresponding to more than 1280×1024 is required, the high frequency clock oscillator is also required to provide the clock signal to the shift register. That is, in case of 1280 dots×1024 scan lines, the high frequency oscillator of 100 to 120 MHz is required. And also the fast processing apparatus is needed and this has a problems of using more expensive apparatus, and of causing a signal interference and noises.

SUMMARY OF THE INVENTION

It is an object to provide a video signal processing apparatus which can obtain a high resolution although using a low frequency oscillator.

To achieve said object, this invention provides a video signal processing apparatus including a CRTC (Cathode Ray Tube Controller) to obtain high resolution, which comprises a dividing counter connected to said CRTC, for providing a first clock to said CRTC and generating a load clock; an oscillator connected to said dividing counter, for providing a second clock to said dividing counter and generating a dot clock; a first video memory means connected to said CRTC, for storing a first video signal; a second video memory means connected to said CRTC, for storing a second video signal; a first shift register connected to said first video memory means, said dividing counter and said oscillator, for converting a first video signal inputted from said first video memory means to a serial stream video signal according to a dot signal inputted from said oscillator; a second shift register connected to said second video memory means, said dividing counter and said oscillator, for converting a second video signal inputted from said second video memory means to a serial stream video signal according to an inverted dot signal inputted from said oscillator; and an OR gate connected to said first and second shift registers, for performing a logic-sum for both outputs provided from said first and second shift registers.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
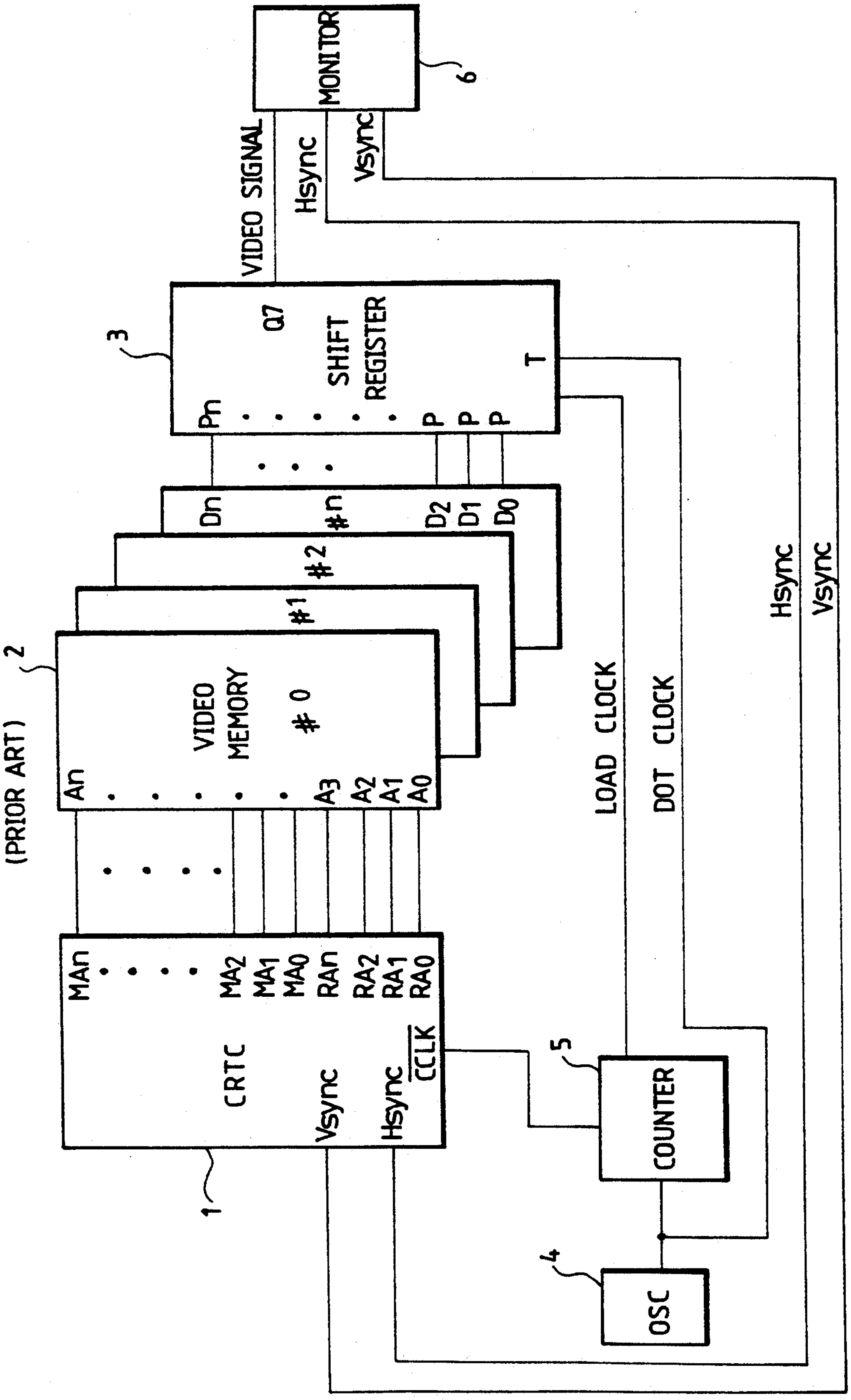
FIG.1 (PRIOR ART)
FIG. 1 is a construction diagram of the conventional video signal processing apparatus.
Figure 2:
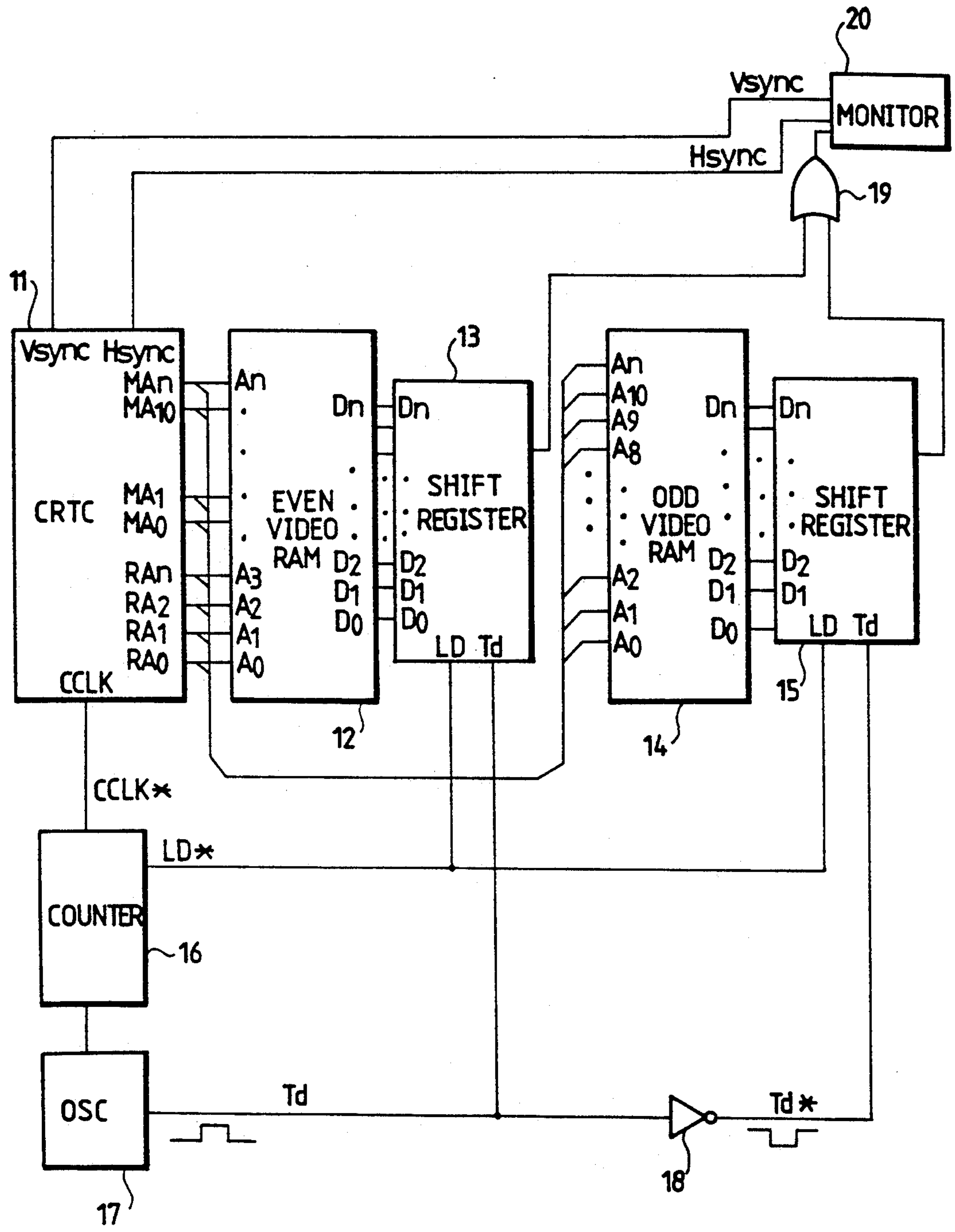
FIG. 2 is a construction diagram of a video signal processing apparatus of this invention.

FIG. 2 shows a construction diagram of a video signal processing apparatus of this invention, and in the drawing, the reference number 11 shows CRTC (Cathode Ray Tube controller), 12 an even video RAM, 13 and 15 shift registers, 14 an odd video RAM (Random Access Memory), 16 a dividing counter, 17 an oscillator, 18 an inverter, 19 an OR gate and 20 a monitor, respectively.

The oscillator 17 generates clocks for providing a dot clock signal and a load clock signal, and the dividing counter 16 generates a character clock (CCLK*) and the load clock (LD*), using said clocks.

The CRTC 11 receives a character clock (CCLK*) from the dividing counter 16 and a horizontal synchronizing signal (Hsync) and a vertical synchronizing signal (Vsync) from the monitor 20, generates a memory address signal (MAO to MAn) and a row address signal (RAO to RAn), and outputs them to the even video RAM 12 and the odd video RAM 14.

The even video RAM 12 stores the even video signal, and outputs that even video signal to the shift register 13 according to the memory address signal (MAO to MAN) and the row address signal (RAO to RAn) outputted from the CRTC 11.

The odd video RAM 14 stores the odd video signal, and outputs that odd video signal to the shift register 15 according to the memory address signal (MAO to MAn) and the row address signal (RAO to RAn).

The shift register 13 receives the load clock (LD*) form the dividing counter 16 and the dot clock (Td) from the oscillator 17, converts the signal parallel stream signal to the serial stream according to said clocks (LD*, Td), and outputs that to the OR gate 19.

The shift register 15 receives the load clock (LD*) from the dividing counter 16 and the inverted dot cock (Td*) by the inverter 18 from the oscillator 17, converts the parallel stream signal to the serial stream signal, and outputs that to the OR gate 19.

The OR gate 19 performs logic-sum for the serial stream video signals outputted through the shift registers 13 and 15.

Figure 3:
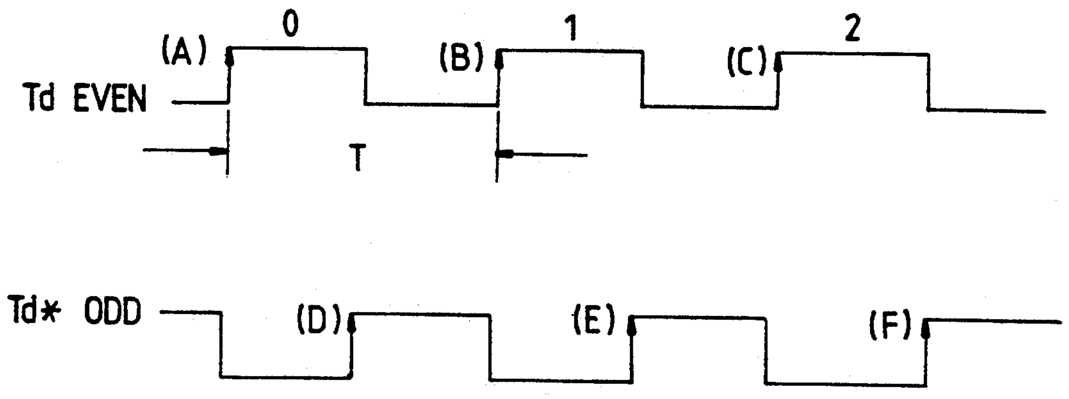
FIG. 3 is a wave-shaping diagram for explaining the operation of FIG. 2.

FIG. 3 shows wave-shaping diagram for explaining the operation of FIG. 2.

The video signal data stored in the even video memory 12 is converted to the serial stream video signal data in the shift register 13 at ½ period of the even dot clock (Td), and the video signal data stored in the odd video memory 14 is converted to the serial data in the shift register 15 at ½ period of the inverted odd dot clock (Td*).

That is, the video signal stored in the even video memory 12 is converted at the rising edge (A, B, C) of the even dot clock (Td), and the video signal stored in the odd video memory 14 is converted at the rising edge (D, E, F) of the inverted odd dot clock (Td*).

Accordingly, the video signals stored in said memories 12 and 14 are outputted at the points of A, B, C and D, E, F, respectively, and as the result, are summed at the OR gate 19. Therefore, the frequency of the dot clock (Td) is a half of that of the conventional dot clock to obtain the same resolution.

What is claimed is:

1. A video signal processing apparatus including a CRTC (Cathode Ray Tube Controller) to obtain high resolution, comprising:

a dividing counter connected to said CRTC, for providing a first clock to said CRTC and generating a load clock;

an oscillator connected to said dividing counter, for providing a second clock to said dividing counter and generating a dot clock;

a first video memory means connected to said CRTC, for storing a first video signal;

a second video memory means connected to said CRTC, for storing a second video signal;

a first shift register connected to said first video memory means, said dividing counter and said oscillator, for converting said first video signal inputted from said first video memory means to a serial stream video signal according to a dot signal inputted from said oscillator;

a second shift register connected to said second video memory means, said dividing counter and said oscillator, for converting said second video signal inputted from said second video memory means to a serial stream video signal according to an inverted dot signal inputted from said oscillator; and an OR gate connected to said first and second shift registers, for performing a logic-sum for both outputs provided from said first and second shift registers.

* * * * *